Figure 1:
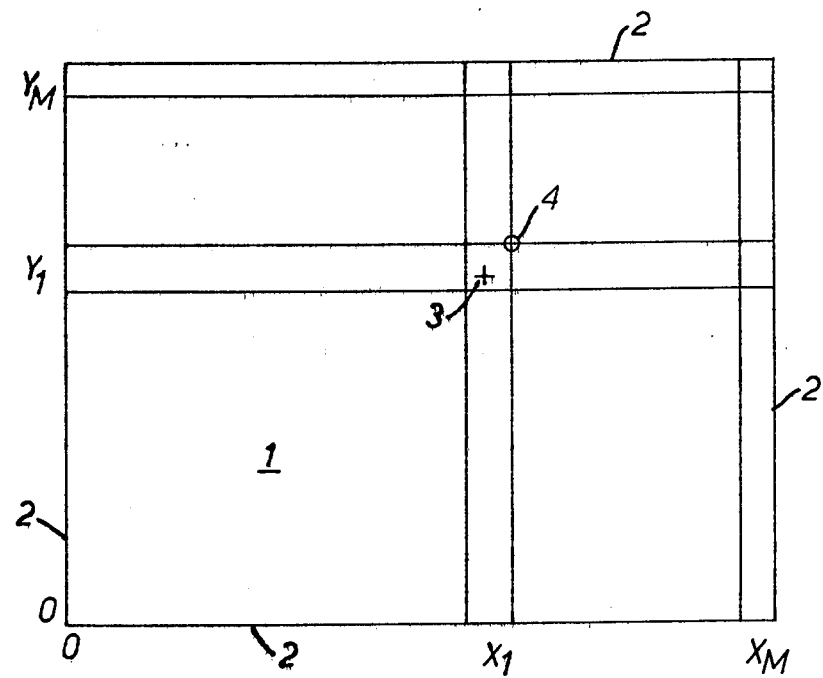

United States Patent [19]

Bird

[11] 4,122,438
[45] Oct. 24, 1978

[54] POSITION ENCODING ARRANGEMENTS

[75] Inventor: Peter Frank Bird, Chelmsford, England

[73] Assignee: The Marconi Company Limited, England

[21] Appl. No.: 760,554

[22] Filed: Jan. 19, 1977

[30] Foreign Application Priority Data

Jan. 21, 1976 [GB] United Kingdom ............ 02269/76

[51] Int. Cl.² ........................................... G06K 15/20
[52] U.S. Cl. ..................................... 340/337; 178/18; 250/549; 340/365 P
[58] Field of Search ........... 340/324 A, 324 AD, 337, 340/365 P, 166 EL; 178/18; 250/549

[56] References Cited

U.S. PATENT DOCUMENTS

| | | |
|---|---|---|
| 3,292,489 | 12/1966 | Johnson et al. ................. 340/324 A |
| 3,576,574 | 4/1971 | Baskin et al. ................. 340/324 AD |
| 3,659,281 | 4/1972 | Mori ................. 340/324 A |
| 3,732,369 | 5/1973 | Cotter ................. 178/18 |
| 3,775,560 | 11/1973 | Ebeling et al. ................. 178/18 |
| 3,860,754 | 1/1975 | Johnson et al. ................. 340/365 P |

Primary Examiner—David L. Trafton

[57] ABSTRACT

A position encoding arrangement is provided having a position locating area from which the positioned co-ordinates of a probe in the area can be found. The invention provides for a change of magnification of the arrangement so that movement of the probe produces a scaled down change in positional co-ordinates. A preferred embodiment provides a light beam encoder for use in conjunction with a C.R.T. type display where a probe is detected and a marker appears on the screen. With the invention change in magnification allows scaled down movement of the marker to allow accurate positioning.

14 Claims, 3 Drawing Figures

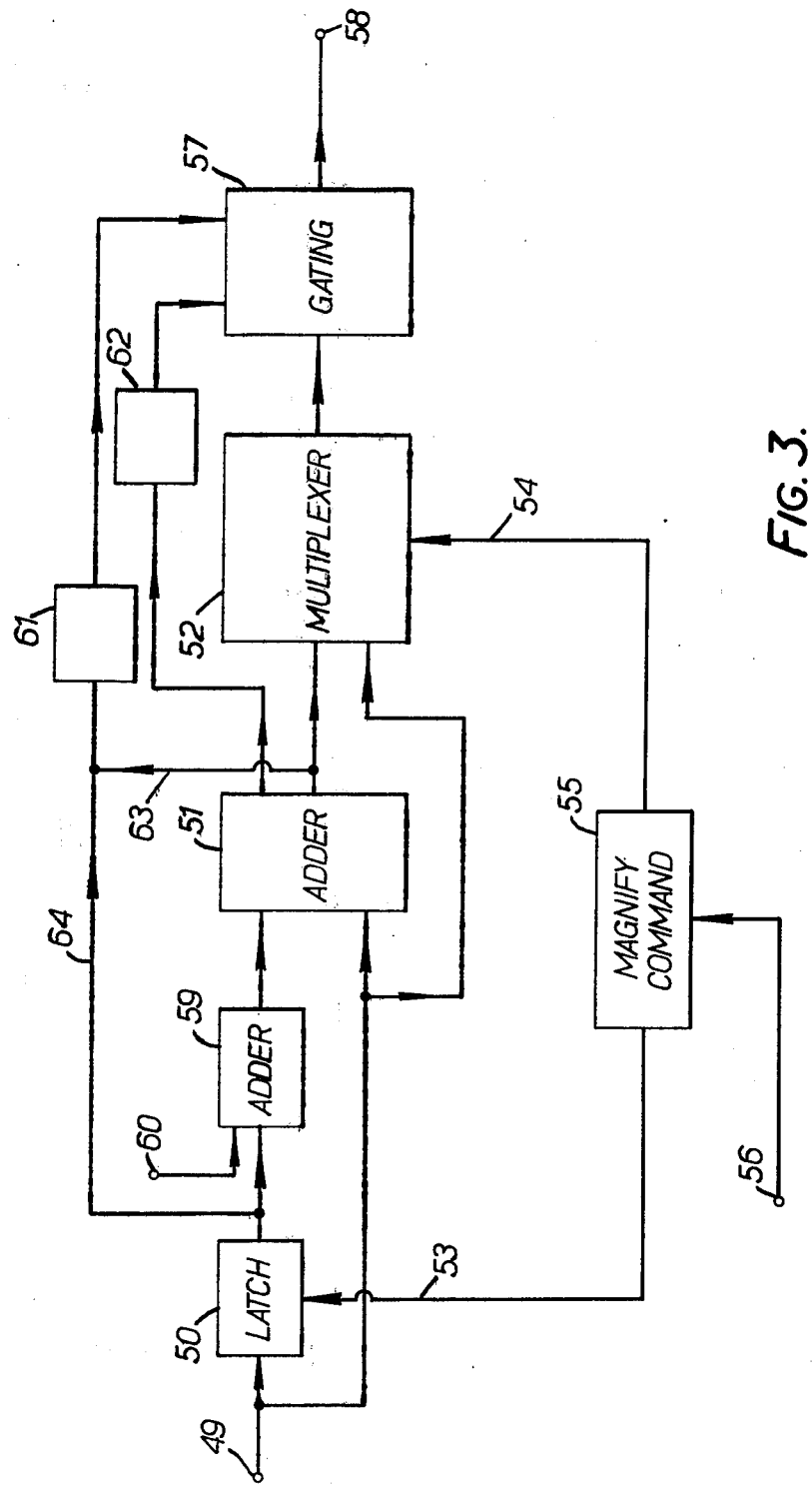

POSITION ENCODING ARRANGEMENTS

This invention relates to position encoding arrangements. Such arrangements find application where it is required to provide an interface between a computer store, an operator and a visible display such as a cathode ray tube (C.R.T.) display. If the C.R.T. were a radar display, then a position encoding arrangement would be used to provide a computer readout of information connected with a target selected from the C.R.T. screen.

Several types of position encoding arrangements are known including the finger interruption infra-red beam device in which an X-Y matrix of light beams is defined across the surface of a C.R.T. by means of photosources (normally Light Emitting Diodes) and receiving devices (normallly photo-diodes or transistors). The placing of a finger or stylus on the C.R.T. screen causes interruption of one or more beams from which the co-ordinates of the interruption can be found.

A further type of encoding arrangement is the pressure sensitive touch overlay.

The types of position encoding arrangements described above are limited in resolution to about one half finger width in each direction. As a result of this restriction the accurate positioning of a "cursor" symbol over a "target" on the screen of a C.R.T. display to 1000 resolvable positions as can be accomplished with a "tracker ball" device has hitherto not been possible.

Whilst it would be possible to use a stylus having smaller cross-sectional dimensions than a finger as the pointer on the screen, this would not be as satisfactory from an operators point of view and in addition, in the case of the crossing light beam encoder, resolution is further restricted by the physical dimensions of the opto-electronic components to a minimum beam spacing of about 6 mm. This is inadequate for many applications that require a resolution of the order of 0.4 mm on a screen of diameter about 300 mm.

This invention seeks to provide a position encoding arrangement in which the above shortcomings are mitigated.

According to this invention there is provided a position encoding arrangement comprising means defining a position locating area; means for providing an indication of the value of at least one positional co-ordinate of a probe introduced into the area and means for changing the magnification of the arrangement whereby a movement of the probe over the area produces a scaled down change in the indicated positional co-ordinate value.

By "probe" is meant a human finger, a stylus, light pen or other positional information output signal initiating device.

Advantageously means are provided responsive to initial detection and subsequent movement of the probe in the locating area for initiating the change in magnification.

Preferably the position locating area is an X-Y area advantageously defined by a plurality of photo-sources in each co-ordinate direction together with associated photo-receiving devices each for receiving a light beam from the associated photo-source.

The term light beam is used generally to include wavelengths outside the region of the visible spectrum.

In case of an X-Y position locating area indications of X and Y positional co-ordinates of the probe are provided and movement of the probe after change of magnification produces a scaled down change in the indication of each co-ordinate.

Conveniently the value of each positional co-ordinate is indicated by a binary code.

Advantageously said position locating area covers a portion of the surface of a cathode ray tube screen means being provided for producing in response to the indications of X and Y positional co-ordinates a marker on the screen representative of the position of said probe, said means producing scaled down movement of the marker in response to said scaled down changes in the indicated positional co-ordinates.

In accordance with one embodiment of the invention there is provided a position encoding arrangement comprising means for producing a code representative of the position of a probe in the locating area; means for storing the code and means responsive to changes in the least significant digit of the generated code for modifying the stored code by the generation of a further series of digits less significant that the said least significant digit of the generated code.

Preferably said arrangement comprises a first store for storing said generated code, a first two-way counter for receiving the code stored in said first store, a second two-way counter connected to count in response to changes in the least significant digit of the code stored in said first store, comparator means for continuously comparing the code stored in said first store with the contents of the said first two-way counter, means for connecting the output of the comparator to control the direction of count of the second two-way counter, and means for combining the counts of the two-way counters to provide said modified code.

Figure 2:
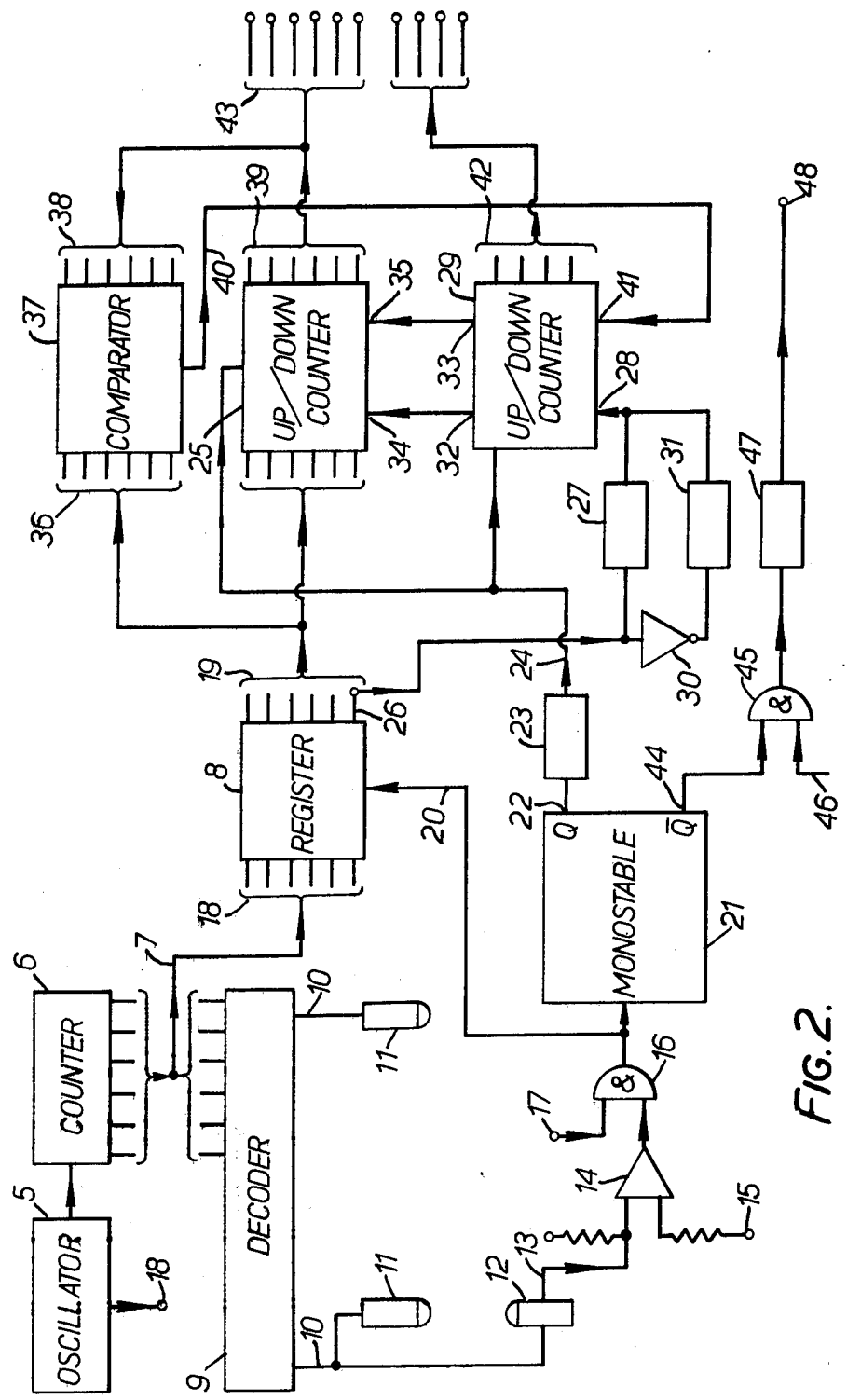

This invention will now be described further with reference to the accompanying drawings in which, FIG. 1 is an explanatory diagram representing a display area FIG. 2 shows a schematic block diagram of one embodiment of the invention Referring to FIG. 1 there is shown an X—Y postion locating area 1 having a boundary 2. For the purpose of explanation it will be assumed that the locating area utilises the infra-red beam arrangement for the detection of a probe, usually an operators finger, positioned within the locating area 1. A number of light emitting devices (not shown) are positioned along one X and one Y edge of the area and a receiving device opposes each emitting device.

The emitting device and receiving devices may be energised sequentially to avoid cross-talk between adjacent beams. The locating area 1 is assumed to be positioned over a C.R.T. screen upon which, for the purposes of explanation only, it will be assumed that a number of radar targets are displayed. One such target is indicated by a cross at 3 and in order to obtain the screen positional co-ordinates of the target 3, which co-ordinate may be used in conjunction with a computer interface to obtain data concerning the target an operator places his finger over the target on the screen.

The exact positional co-ordinates of the target 3 will not be provided because in this case the target does not lie exactly on the intersection of two crossing light beams. Further more the operators finger on being placed over the target cuts more than one light beam, in this case two beams, in each co-ordinate direction. The position encoding circuitry will provide the positional co-ordinates of one beam intersection point and this will usually be the upper right intersection $X_1Y_1$. The circuitry controlling the display of information on the C.R.T. will use the co-ordinates provided to cause a marker to be displayed on the screen and this is represented at 4.

The magnification is now activated automatically immediately the operators finger is detected in the area 1. The operators finger is now moved and in doing so will intersect, sequentially, one or more additional light beams. Further positional information will be obtained as each additional beam is cut and this is used to obtain a fine adjustment to the originally obtained positional co-ordinates. This fine adjustment is used by the C.R.T. circuitry to cause the marker 4 to move across the screen by a distance scaled down compared with the movement of the finger. The exact distance moved by the marker will depend upon the amount of magnification introduced but can be expressed as 1/M of the finger movement distance, where M is the magnification.

Thus by moving the finger in the appropriate direction through one or more additional beams the marker 4 can be finely adjusted in position to lie exactly over the target 3 and the finely adjusted positional co-ordinates can be used to obtain information relevant to that target. FIGS. 2 and 3 show different embodiments for carrying out the fine positional adjustment following initial detection of the operators finger. For the purposes of explanation, only the X co-ordinate direction will be considered but a substantially identical arrangement will usually be provided for the Y co-ordinate direction. In FIG. 2 an oscillator 5 drives a six bit binary counter 6. The parallel counter stage outputs are connected to a decoder 9 which provides an output signal on one of 64 output lines 10 depending upon the value of the count of the counter 6. Each output line 10 is connected in parallel to a respective light emitter 11 and corresponding receiving device 12. Only two out of 64 emitters are shown and only one receiving device. The outputs of all receiving devices are connected in parallel to line 13.

The appropriate emitter 11 and receiving device 12 are energised by the decoder 9 and assuming no beam is interrupted and ignoring transitional effects between successive outputs from the decoder 9, the voltage level on line 13 will be substantially constant. The signal on line 13 is fed to one input of a comparator 14 having a second input 15 connected to receive a fixed reference voltage. The output of the comparator 14 is fed to one input of an AND gate 16 a second input 17 of which receives a strobe signal from output terminal 18 of the oscillator 5. The AND gate 16 is effective to remove transitional effects between successive outputs from the decoder 9 and if no beams are interrupted provides a constant voltage level output.

When a light beam is interrupted the voltage level on line 13 will change during the normal 'ON' period of that beam and will produce a change in level in the output from the comparator 14 which will appear as an output "touch pulse" from the gate 16. At the time the interrupted beam is energised an identifying code is present in the counter 6. The parallel outputs of the counter 6 are connected over line 7 to the inputs 18 of a register 8 and the code presented at the inputs 18 are clocked to the outputs 19 of the register by the "touch pulse" output of the AND gate 16 connected over line 20.

The code identifying the interrupted beam appears therefore at the outputs 19 of the register 8. The "touch pulse" output of the AND gate 16 triggers a monostable 21 causing the Q output 22 to change from a logical '0' to '1'. This logical '1' causes a pulse generator 23 to provide an output pulse which is connected over a line 24 to the "LOAD" input of a six-bit up/down counter 25 and to clear a four-bit up-down counter 29. The pulse at the load input of the counter 25 causes the count present in the outputs 19 of the register 8 to be transferred over line 26 into the counter 25.

The monostable 21 has a period which is long compared with an energisation cycle of each emitter/receiver pair 11, 12 and consequently assuming a beam remains interrupted for several cycles, a "touch pulse" will trigger the monostable at intervals shorter than the monostable period and the monostable will therefore remain with its Q output permanently set at '1'. Only a single pulse will therefore be provided by the pulse generator 23 during the transition of the Q output 22 from '0' to '1' and therefore the contents of the register 8 are only transferred into the counter 25 on the first touch pulse and no further transfers take place until the interrupting finger is completely removed and the monostable 21 completes a cycle.

Each touch pulse will, however, in view of the connection over the line 20, cause the count of the counter 6 representative of that touch to appear at the outputs 19 of the register 8. Assume now that a touch has been made and the six bit code representative of the X co-ordinate of the touch has been entered into the counter 25. The operator now moves his finger, which caused the first beam interruption, so that an adjacent beam is interrupted. This will cause, over a cycle of the decoder 9, the least significant digit output 26 of the register outputs 19 to change. The least significant digit output 26 is connected via a pulse generator 27 to the clock input 28 of a four bit up/down counter 29 and also to an inverter 30. The output of inverter 30 is connected to a pulse generator 31 which also feeds the clock input 28 of the counter 29. The pulse generators 27 and 31 and the inverter 30 ensure that a clock pulse appears at the clock input 28 whether or not the output 26 increases or decreases. The counter 29 is coupled to the counter 25 by means of "carry" and "borrow" terminals 32 and 33 which are respectively connected to "up" and "down" terminals 34 and 35 of the counter 25 so that the count of the counter 25 is automatically adjusted as the counter 29 counts.

The outputs 19 of the register 8 are coupled to one set of parallel inputs 36 of a comparator 37 a second set of inputs 38 of which are connected to outputs 39 of the counter 25. The counts in the counter 37 and the register 8 are thus continuously compared and the comparator 37 indicates at output line 40 which set of inputs discloses the greater count. The output 40 is connected to an up/down selection input 41 of the counter 29 to control the direction of count of that counter. The counter 29 has four output bits 42 which in conjunction with the six output bits 39 of the counter 25 provide 10 output bits 43 for the X direction the 4 bits of the counter 29 being less significant than the 6 bits of the counter 25.

The movement of the finger which causes the least significant digit of the original 6 bit code in the register 8 to change has resulted in a position identifying 10 bit code being generated i.e. the movement of the finger has been scaled down. The 10 bit code is utilised by the deflection controlling circuits of the C.R.T. of FIG. 1 to produce an adjustment of the position of the marker 4 which therefore also moves a scaled down distance compared with the movement of the operators finger. This allows accurate positioning of the marker over the target 3. The accuracy is effectively increased from the sixty four resoluable positions of the 6 bit code to 1,024 positions.

When the marker 4 has been accurately positioned the finger is removed. This causes the "touch pulse" output from the gate 16 to disappear. The monostable 21 completes its cycle and the Q output 22 goes low and the $\overline{Q}$ output 44 goes high. The $\overline{Q}$ output 44 is connected to one input of AND gate 45 which receives a second input 46 from a corresponding monostable for the Y direction.

When the marker 4 is accurately positioned in each co-ordinate direction the gate 45 will receive two high inputs and will provide a high output. A pulse generator 47 responds to the AND gate output going high and produces an output pulse at the terminal 48. The pulse at the terminal 48 is then used as an output data strobe so that information relevant to the target 3 identified by the two ten bit codes can be read out of a computer.

Whilst the arrangement of FIG. 2 has been described with reference to the encoding of the positions of targets on C.R.T. screen this is no way essential or limiting and the invention could equally well be applied to position control in other fields.

We claim:

1. A position encoding arrangement comprising means defining a position locating area; means for providing an at least approximate indication of the value of at least one positional co-ordinate of a probe introduced into the area, and means for changing the magnification of the arrangement to improve the accuracy of the positional co-ordinate whereby a movement of the probe over the area produces a scaled down change in the indicated positional co-ordinate value to produce a fine adjustment of said positional co-ordinate.

2. An arrangement as claimed in claim 1 in which operator controllable means is provided for initiating the change in magnification.

3. An arrangement as claimed in claim 1 in which the means for changing the magnification includes means responsive to initial detection and subsequent movement of the probe in the locating area.

4. An arrangement as claimed in claim 1 in which the positional locating area is an x-y area.

5. An arrangement as claimed in claim 4 in which the x-y area is defined by a plurality of photo-sources in each co-ordinate direction together with associated photo-receiving devices each for receiving a light beam from the associated photo-source.

6. An arrangement as claimed in claim 4 in which indications of X and Y positional co-ordinates of the probe are provided and movement of the probe after change or magnification produces a scaled down change in the indication of each co-ordinate.

7. An arrangement as claimed in claim 1 in which the value of the or each positional co-ordinate is indicated by a binary code.

8. An arrangement as claimed in claim 4 in which said position locating area covers a portion of the surface of a cathode ray tube screen means being provided for producing in response to the indications of X and Y positional co-ordinates a marker on the screen representative of the position of said probe, said means producing scaled down movement of the marker in response to said scaled down changes in the indicated positional co-ordinates.

9. A position encoding arrangement as claimed in claim 1 and including means for producing a code representative of the position of a probe in the locating area; means for storing the code and means responsive to changes in the least significant digit of the generated code for modifying the stored code by the generation of a further series of digits less significant than the said least significant digit of the generated code.

10. An arrangement as claimed in claim 9 in which said arrangement comprises a first store for storing said generated code, a first two-way counter for receiving the code stored in said first store, a second two-way counter connected to count in response to changes in the least significant digit of the code stored in said first store, comparator means for continuously comparing the code stored in said first store with the contents of the said first two-way counter, means for connecting the output of the comparator to control the direction of count of the second two-way counter, and means for combining the counts of the two two-way counters to provide said modified code.

11. A position encoding arrangement as claimed in claim 1 comprising means for producing a code representative of the position of a probe in the locating area, means for modifying the code to change the effective locating area dimensions and to change the origin of the locating area to centre said area at a position represented by said code and means responsive to subsequent movement of said probe for further modifying the code to provide an increased number of significant digits.

12. An arrangement as claimed in claim 11 in which means are provided for inhibiting output of the further modified code when the probe is located at a periphery of the locating area.

13. A position encoding arrangement comprising, in combination:
   means defining a plurality of positional co-ordinates within a given area;
   means responsive to the presence of a probe adjacent said area for initially encoding the location of at least one positional co-ordinate of said probe according to a first code to provide positional information about said probe; and
   means responsive to continued presence of said probe adjacent said area for altering said encoding to a second code having greater resolution than said first code whereby movement of the probe over said area produces a change in said positional information which is scaled down with respect to the positional change of said probe.

14. In a position encoding arrangement including a display indicating at least one target location within a given area, the combination of:
   means defining a plurality of positional co-ordinates within said given area;
   means responsive to the presence of a probe adjacent said area for initially encoding the position of said probe according to the scale of said positional co-ordinates and for correspondingly displaying the position of said probe at one of said positional co-ordinates; and
   means responsive to continued presence of said probe adjacent said area for magnifying the initial encoding whereby movement of said probe over said area causes a scaled down movement of the probe display to permit accurate registry of said probe display with said target location.

* * * * *